United States Patent [19]
Rich

[11] Patent Number: 5,949,426
[45] Date of Patent: Sep. 7, 1999

[54] NON-LINEAR TEXTURE MAP BLENDING

[75] Inventor: Henry H. Rich, Raleigh, N.C.

[73] Assignee: Integrated Device Technology, Inc., Santa Clara, Calif.

[21] Appl. No.: 08/787,752

[22] Filed: Jan. 28, 1997

[51] Int. Cl.[6] .................................................. G06T 5/00
[52] U.S. Cl. ........................................ 345/430; 345/429
[58] Field of Search .................................. 345/428, 429, 345/430, 431, 432

[56] References Cited

U.S. PATENT DOCUMENTS

| | | | |
|---|---|---|---|
| 4,586,038 | 4/1986 | Sims et al. | 340/729 |
| 4,590,465 | 5/1986 | Fuchs | 340/723 |
| 4,692,880 | 9/1987 | Merz et al. | 364/521 |
| 4,727,365 | 2/1988 | Bunker et al. | 340/728 |
| 4,783,649 | 11/1988 | Fuchs et al. | 340/747 |
| 4,827,445 | 5/1989 | Fuchs | 364/900 |
| 4,905,164 | 2/1990 | Chandler et al. | 364/518 |
| 4,965,745 | 10/1990 | Economy et al. | 364/518 |
| 5,327,509 | 7/1994 | Rich | 382/17 |
| 5,388,206 | 2/1995 | Poulton et al. | 395/163 |
| 5,396,346 | 3/1995 | Nakayama et al. | 358/448 |
| 5,455,600 | 10/1995 | Friedman et al. | 345/153 |
| 5,471,572 | 11/1995 | Buchner et al. | 345/433 |
| 5,481,669 | 1/1996 | Poulton et al. | 395/164 |
| 5,579,456 | 11/1996 | Cosman | 345/428 |
| 5,651,104 | 7/1997 | Cosman | 345/428 |

FOREIGN PATENT DOCUMENTS

WO 92/09947  6/1992  WIPO.

OTHER PUBLICATIONS

Fuchs et al., Fast Spheres, Shadows, Textures, Transparencies, and Image Enhancements in Pixel–Planes, *Association for Computing Machinery's SIGGRAPH '85*, pp. 111–120.

Williams, Lance, Pyramidal Parametrics, *Computer Graphics*, vol. 17, No. 3, pp. 1–11 (Jul. 1983).

*Primary Examiner*—Phu K. Nguyen
*Assistant Examiner*—Cliff N. Vo
*Attorney, Agent, or Firm*—Myers Bigel Sibley & Sajovec

[57] ABSTRACT

Methods, systems and computer program products for texturing a picture element of an image. These methods, systems and computer program products include blending texture values from a first texture map corresponding to a first level of detail with texture values from a second texture map corresponding to a second level of detail to create a textured value for the picture element. The blending of the two texture maps, however, only occurs if the magnitude of deviation of the level of detail corresponding to the picture element from a level of detail of the first texture map is greater than a threshold value. The threshold value may be selected based upon the perceptibility of differences between the level of detail of the picture element and the level of detail of the first texture map.

45 Claims, 3 Drawing Sheets

NON-LINEAR TEXTURE MAP BLENDING

FIELD OF THE INVENTION

The present invention relates to image generation and computer displays. More particularly, the present invention relates to the blending of texture maps to create a texture value for a picture element.

BACKGROUND OF THE INVENTION

The addition of texture patterns to computer generated graphic images is a significant enhancement that is useful in a wide variety of visual image generation applications.

In a computer generated image, picture elements (pixels) of the display on which the image is displayed have associated with them two-dimensional coordinates ("screen coordinates"). These screen coordinates uniquely identify each pixel in the display. Each screen coordinate then has associated with it values, such as red, green and blue values ("RGB values") which define the appearance of the pixel. Polygons or objects may then be generated by defining the color or intensity values for each pixel based on the screen coordinates of the pixel.

The addition of texture to a polygon in a computer generated image may use perspective transformation information together with texture mapping information to create values for each pixel reflecting a two-dimensional representation of a textured surface in three dimensional space. One method of texturing object in a computer generated image is through the use of what is referred to in the art as a MIP-MAP such as is described by Williams in an article entitled Pyramidal Parametrics, Computer Graphics, Vol. 17, No. 3, pp. 1–11 (1983).

In the texturing process, pixels corresponding to each polygon in screen coordinates are provided with coordinate values within texture space (u,v) and with a level of detail ("LOD") value. The LOD represents the area of a pixel in the texture space and will ultimately be reflected in the selection of MIP MAPS (texture maps) for texturing. The resultant set of (u,v and LOD) points correspond to redefined color and intensity values or "texels" defined within a texture space.

The term perspective transformation is used to denote the process of computing an object's instantaneous orientation in relationship to a viewer of a graphical image. The perspective transformation of the objects of a scene defines an image composed of polygons which are defined in the x, y space of screen coordinates. Perspective transformation produces a matrix of polygon vertices specified with u, v and LOD values.

The result of perspective projection is to convert from three dimensional space to x-y two dimensional space with certain information also being determined which is dependent on the third dimension such as u, v and LOD. Typically, the LOD of a given texel, pixel or polygon is determined in the rendering steps of an application or system program module taking into account the distance and angle of view of the textured surface. The levels of detail of a texture map are conventionally precomputed for later access during rendering.

Displaying a textured pixel value typically requires that the different intensity values and other contributory qualities, such as illumination and shading, be calculated on the basis of a pre-defined texture map. The (u,v) and LOD values that define the position in texture space can be in fractional form, where none of the three values correspond to an exact pre-defined texel coordinate map value.

If the fractional part of the texture space mapped pixel address is simply truncated for the look-up of the texel value, then certain anomalies may occur in the computed image. The anomalies include unnatural variations in the appearance of the texture pattern in successive frames of an animated sequence. To avoid these anomalies, conventional methods have calculated the exact RGB or YIQ intensity values for each pixel on the display screen by accessing a set of individual, predefined texel intensity values that are stored in dedicated texture map memory. Typically, the four most proximal points are selected from each of the two proximal level of detail planes of each of three contributory texture maps (e.g. a red contribution map, a green contribution map, and a blue contribution map). Thus, a total of eight red, eight green and eight blue values are accessed for each computed pixel. The polygon pixel contribution values are generated by blending the eight sampled texture map points through interpolation. In the case of a system using RGB components, the interpolation is carried out in each of the three component color maps, and the results are used together as the resultant color intensities for display by an individual pixel on a graphics screen.

Accessing the texture map texel values, that generally must be obtained repeatedly from a memory that is off the chip that does the interpolation, may be time consuming in the context of high quality graphical image generation. Managing texture information via conventional techniques and with conventional hardware arrangements, therefore, is well known as being expensive and burdensome to a process that requires rapid generation of superior computer graphic images.

Methods of providing video images are described in U.S. Pat. No. 4,905,164 to Chandler et al. An expressed object of Chandler et al. is to obtain color cell texture modulation while minimizing hardware requirements. Another attempt to reduce the hardware costs of texture processors is described in a Sims et al. U.S. Pat. No. 4,586,038. This method involves the use of texture and shading gradients in three dimensional space to define texture modulations. Similarly, Merz et al., U.S. Pat. No. 4,692,880, and U.S. Pat. No. 4,965,745, to Economy et al. also describe image texturing.

As discussed above, in light of the increasing emphasis on higher quality computer generated images, particularly images with texturing, a need exists for efficient computation of textures for visual display.

SUMMARY OF THE INVENTION

In view of the above discussion, it is one object of the present invention to increase the performance of image generation systems which provide texturing of computer generated images.

A further object of the present invention is to reduce the number of texture map accesses required for texturing computer generated images.

These and other objects of the present invention are provide by methods, systems and computer program products for texturing a picture element of an image. These methods, systems and computer program products include blending texture values from a first texture map corresponding to a first level of detail with texture values from a second texture map corresponding to a second level of detail to create a textured value for the picture element. The blending of the two texture maps, however, only occurs if the magnitude of deviation of the level of detail corresponding to the picture element from a level of detail of the first texture map is greater than a threshold value. The threshold value may be selected based upon the perceptibility of differences between the level of detail of the picture element and the level of detail of the first texture map.

By selectively blending texture maps only when the difference between the level of detail of the pixel being textured and the level of detail of a stored texture map is greater than a value, for many pixels there will only need to be one texture map utilized to determine the texture value of the pixel. For such pixels texture values from only one predefined texture map need to be fetched to determine the texture value for the pixels. By increasing the number of pixels which require texture values from only one texture map to determine the texture value for those pixels the overall number of fetches of texture maps to texture an object in an image may be reduced. By reducing the number of fetches of texture map elements the texture values for an object may be calculated more rapidly, thereby increasing the performance of the image generation system for generating textured images. Also, the reduction in the number of elements which are blended together may reduce the overall number of processing operations required to determine texture values and may, therefore, further improve the performance of the image generation system.

If the threshold is set high enough, no blending would be done between texture maps in the creation of texture values for any pixel. However, such a lack of blending may not provide smooth transitions as the relative distance of the textured object changes and, therefore, may provide unacceptable results. Thus, the present invention provides for blending texture maps for selected pixels so as to overcome the visual disadvantages of no blending but without the performance disadvantages of blending for every pixel.

When texture maps are blended, the texture values of the texture maps may be proportionally blended by blending the texture value of the picture element based upon the texture values of the first texture map and the texture value of the picture element based upon the texture values of the second texture map. This blending may be based upon the difference between the level of detail of the picture element and the level of detail of the first texture map.

In another embodiment of the present invention, texture values from a first texture map corresponding to a first level of detail are blended with texture values from a second texture map corresponding to a second level of detail to create a textured value for the picture element. These texture values are blended if the magnitude of deviation of the level of detail corresponding to the picture element from the level of detail of the first texture map is greater than a threshold value. However, the textured value for the picture element is determined from the texture values of the first texture map if the magnitude of the deviation of the level of detail of the picture element from the level of detail of the first texture map is less than the threshold value.

As discussed above, the blending may include the step of proportionally blending the texture values of the first texture map and the texture value of the picture element based upon the texture values of the second texture map based upon the difference between the level of detail of the picture element and the level of detail of the first texture map. The threshold value may also be selected based upon the perceptibility of differences between the level of detail of the picture element and the level of detail of the first texture map.

In a further embodiment of the present invention, the blending of texture values may include blending texture values from the texture map corresponding to the first level of detail which are proximate to the picture element only if the fractional coordinates of the picture element are not within a threshold of coordinates of a texture value from the texture map corresponding to the first level of detail.

By selectively blending texture values from the proximate elements of the texture map only if the coordinates of the pixel in texture space differs from the coordinates of an element of the predefined texture map by more than a predefined threshold the number of elements of a texture map of a particular level of detail which are required to determine the texture value for the picture element may also be reduced. Thus, the number of fetches of texture values for a texture map of a particular level of detail may be reduced with a corresponding reduction in the number of memory accesses required to texture an object. Accordingly, the performance of an image generation system may be increased by reducing the amount of accesses to texture memory and reducing the number of operations to blend the texture values of the texture maps to create the texture value of a pixel, thereby increasing the speed with which textured images may be generated.

In yet another embodiment of the present invention, a picture element of an image having a level of detail associated with the picture element is textured by acquiring a first set of texture values from a texture map corresponding to a first level of detail associated with the level of detail of the picture element. A textured pixel value is determined for the picture element from the first set of texture values. A second set of texture values from a texture map corresponding to a second level of detail associated with the level of detail of the picture element is also acquired if the level of detail of the picture element is not within a threshold of the first level of detail. A blended texture pixel value for the picture element may then be determined based on the first set of texture values and the second set of texture values if the level of detail of the picture element is not within the threshold of the first level of detail.

In a particular embodiment of the present invention, the acquisition of a first set of texture values from a texture map corresponding to a first level of detail comprises the fetching from a texture memory texture values of the texture map corresponding to the first level of detail. The second acquisition of a second set of texture values from a texture map corresponding to a second level of detail may then comprise fetching from a texture memory texture values of the texture map corresponding to the second level of detail.

In yet another embodiment of the present invention, the blended texture pixel value is determined by also determining a textured pixel value for the picture element from the second set of texture values if the level of detail of the picture element is not within the threshold of the first level of detail. The blended texture pixel value for the picture element is then determined by proportionally blending the textured pixel value determined from the first set of texture values and the textured pixel value determined from the second set of texture values to provide the blended texture pixel value if the level of detail of the picture element is not within the threshold of the first level of detail. The proportional blending of the textured pixel values may include blending the textured pixel values based on the difference between the level of detail of the picture element and the level of detail of at least one of the texture map corresponding to the first level of detail and the texture map corresponding to the second level of detail.

DETAILED DESCRIPTION OF THE PREFERRED EMBODIMENTS

Figure 1:
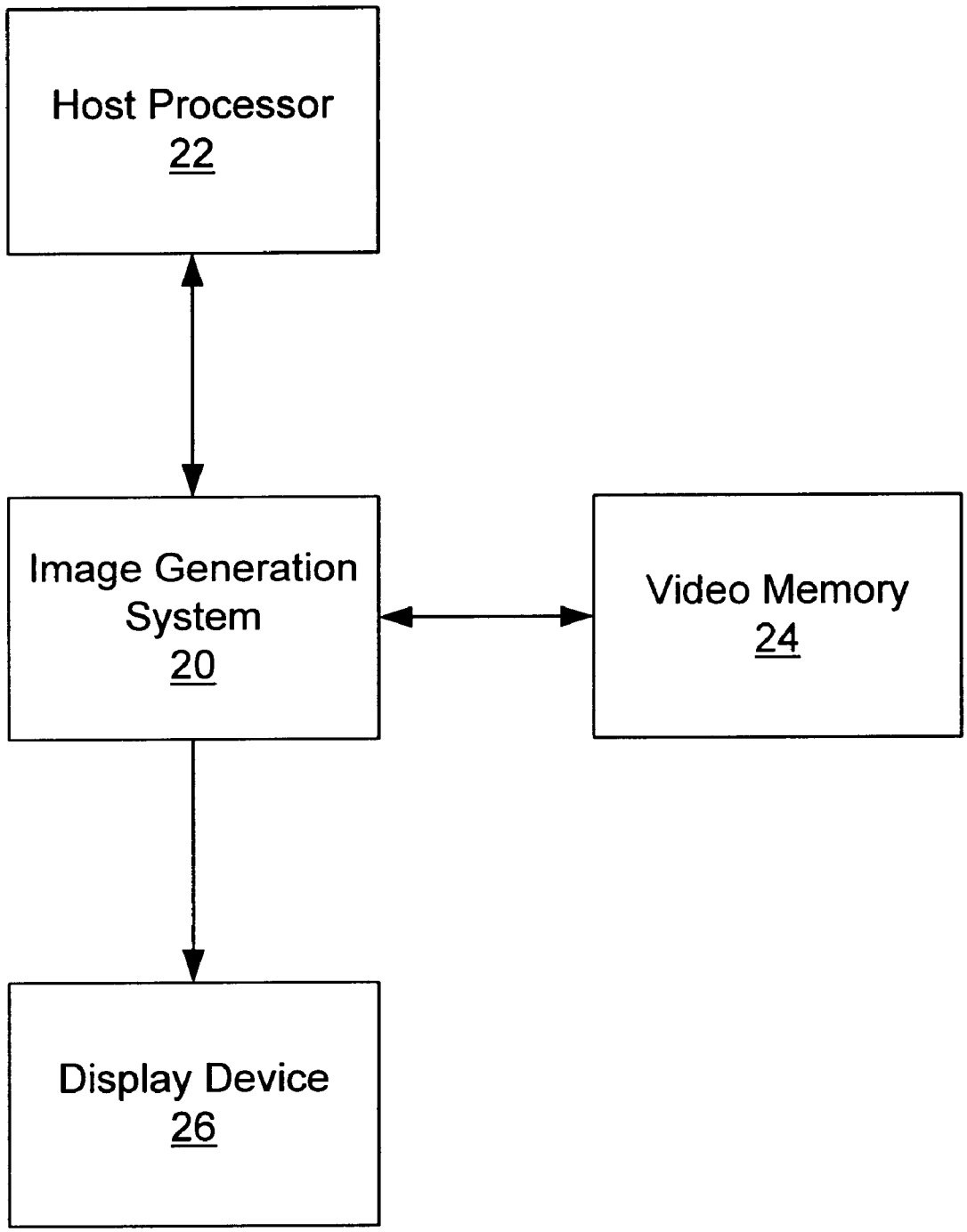
FIG. 1 is a block diagram of one embodiment of a system according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 1 illustrates one image generation system which may utilize the present invention. As seen in FIG. 1, an integrated image generation system 20 communicates with a host processor 22, video memory 24 and a display device 26. The integrated image generation system 20 receives information from the host processor 22 from which the image generation system 20 generates an image to be displayed on the display device 26. Host processor 22, image generation system 20, video memory 24 and display device 26 may be standard elements of a personal computer system or may be custom devices such as are known to those of skill in the art and need not be described further herein.

In one aspect of the present invention, the image generation system 20 is provided with information about the image to be generated and displayed by a controlling process executing in the host processor 22 (by hardware or a combination of hardware and software). The image generation system 20 processes the information and results in an array of values corresponding to the pixels of the display device 26 such that the values define visible characteristics of each pixel to be displayed. Thus, the information to be displayed by the display device 26 may be viewed as a pixel array or array of pixels with pixel values for each element of the array which are determined by the image generation system 20 based on the information provided by the host processor 22. For example, these pixel values may be red, green and blue color values (RGB values) for each pixel. These values are then stored in video memory 24 for display on display device 26.

The image generation system 20 may generate texture values for a pixel through the use of texture maps. These predefined texture maps may be stored in a texture memory resident in or external to the image generation system 20. The texture maps may also be stored in other storage areas such as video memory 24, general purpose memory in the processor 22 or even on a fixed disk or other non-volatile memory device. The texture maps may contain texture values in the u, v, LOD coordinate space ("texture space") which correspond to a texture to be displayed such that each texture value has associated with it a unique u and a unique v coordinate value while each texture value in a texture map shares a common LOD value. Thus, the texture map defines a plane in texture space. Furthermore, in the case of an RGB system, each texture map may be for a single color component as described above.

To generate a textured pixel value the image generation system 20 maps the pixel coordinates to texture space to generate u, v, LOD values for the pixel. As described above, the results of this mapping are often fractional values for u, v, and LOD. As many LOD values for pixels will fall between the discrete LOD values for the stored texture maps, the image generation system 20 may blend values from more than one texture map to generate the texture value for the LOD of the pixel. Furthermore, the image generation system 20 may blend together more than one texture value from a texture map to produce a texture value for the level of detail of the texture map. Thus, for many pixels multiple texture maps, as well as multiple texture values from each texture map, may be accessed to determine the texture value of the pixel. This blending often requires multiple accesses of texture memory to fetch the multiple texture maps and/or texture values which may reduce the speed with which the image generation system 20 determines the texture value for a pixel. However, the frequency with which multiple texture maps and/or texture values for a level of detail are required to determine the texture value for a pixel may be reduced through the utilization of the present invention, and, thus, the speed with which a texture value for a pixel may be increased over systems utilizing blending for all pixels with LOD values which do not fall in a texture map plane.

According to the present invention, in determining the texture value for a pixel the image generation system 20 blends the texture values from more than one texture map only if the magnitude of deviation of a pixels level of detail from the level of detail of a texture map is greater than a threshold value. Similarly, multiple texture values from a single texture map may also only be utilized if the fractional coordinates of the picture element mapped into texture space differ from the coordinates of a texture value of the texture map by more than a threshold.

Figure 2:
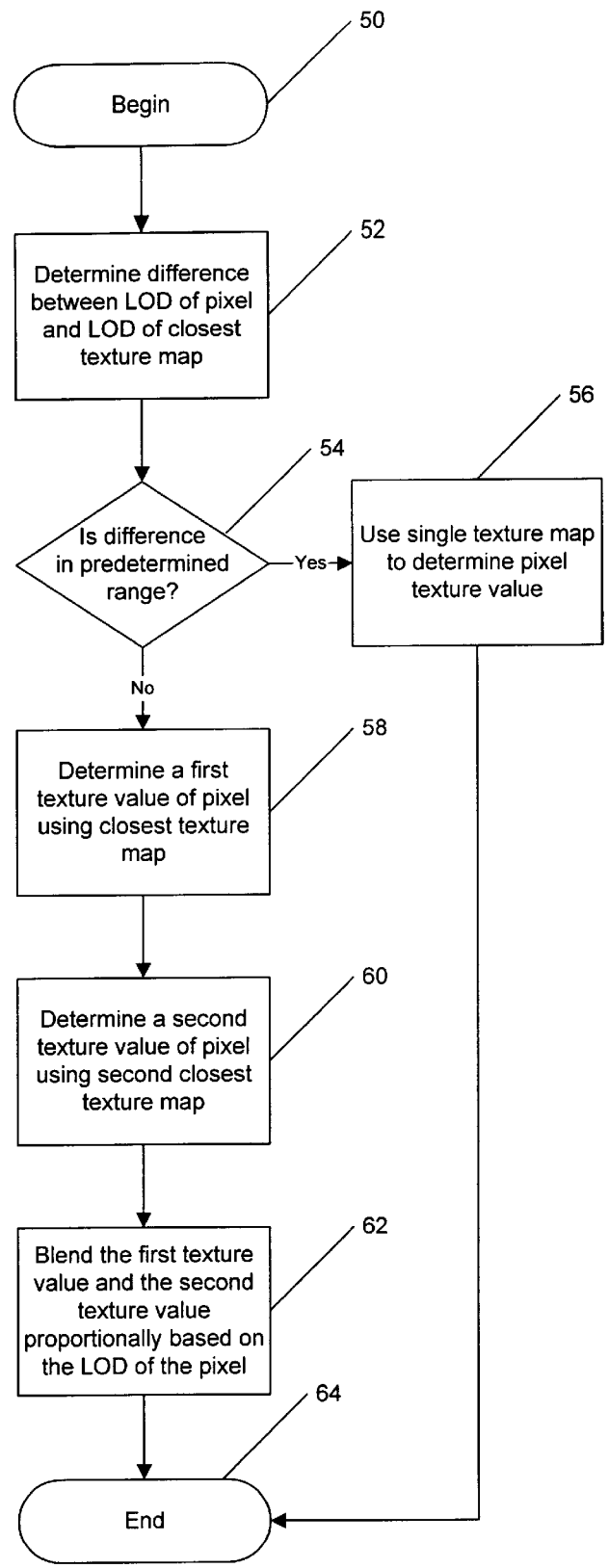
FIG. 2 is a flow chart illustrating the operation of one embodiment of the present invention.

The present invention will now be described with references to FIG. 2 and FIG. 3. As seen in FIG. 2, the texturing of a picture element begins with the determination of the difference between the level of detail of the picture element mapped to texture space and the texture map with the closest or most proximate LOD to the LOD of the picture element (blocks 50 and 52). As seen in block 54, if the difference between the LOD value of the picture element and the LOD of the most proximate texture map is within a range or threshold, then only a single texture map is utilized in determining the texture value for the picture element. Thus, as seen in Block 56, the texture map of the most proximate level of detail to the level of detail of the picture element is utilized in determining the pixel texture value.

Similarly, after mapping of the picture element to texture space, the difference between the most proximate element of the texture map and the u, v coordinates of the picture element can be determined to determine if that difference is within a threshold. If the difference is within a threshold, then a single element from the texture map may be utilized in determining the texture value for the picture element. Otherwise, if the difference between the u, v coordinates of the most proximate element of the texture map and the u, v coordinates of the picture element is greater than the threshold, then the four most proximate elements of the texture map may be blended together based on the u, v coordinates of the picture element to determine the texture value for the level of detail of the texture map. The blended texture value for the LOD of the texture map may then be utilized to determine the texture value of the picture element. The blended texture value may also be blended with blended texture values determined for other texture maps to arrive at the blended texture value for the picture element.

As will be appreciated by those of skill in the art, other reductions in the number of texture values for a texture map utilized in determining a texture value for a picture element may be achieved through the partial blending of less than four values from a texture map. For example, a u threshold value and a v threshold value could be established such that if the u value of a mapped picture element is within the threshold then a single u value is utilized in calculating a texture value for the texture map and only two texture values are blended. Also, if the v coordinate of the picture element differs from a v coordinate in the texture map by less than the v threshold value, then a single v coordinate may be utilized in calculating the texture value for the picture element and, again, only two texture values are blended. Thus, one, two or four elements of a texture map may be utilized in calculating the texture value for a picture element for a given level of detail.

Returning to FIG. 2, if the difference between the level of detail of the picture element mapped to texture space and the level of detail of the closest texture map is not within the threshold (block 54) then a first texture value is determined using the texture map with the closest level of detail to that of the picture element(block 58). As seen in block 60, a second texture value for the picture element is also determined using the texture map having the second most proximate level of detail to that of the picture element mapped to the texture space.

As seen in block 62, the two texture values corresponding to the two most proximate levels of detail are then blended together based upon the difference between the level of detail of the picture element mapped to texture space and the level of detail values of the texture maps from which the two texture values were generated. Thus, the texture value for the picture element is determined by selectively utilizing the two most proximate levels of detail to the picture element and proportionally blending texture values generated from the texture maps to arrive at a final blended value.

Figure 3:
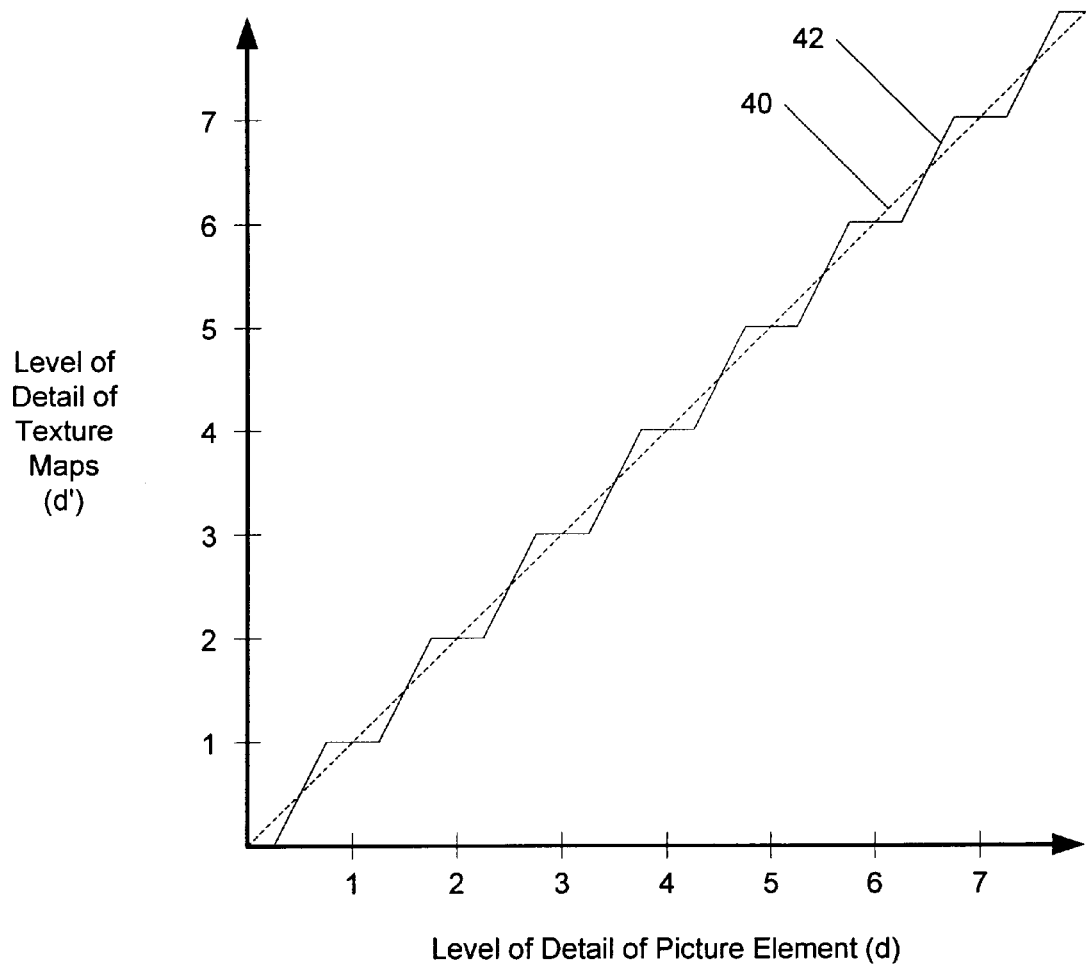
FIG. 3 is a graph illustrating one transfer function for use in the present invention.

One example of the transfer function between the level of detail of the picture element and level of detail of the texture maps used to generate the texture value for the picture element is illustrated in FIG. 3. Line 40 in FIG. 3 illustrates a conventional blending of texture values from two texture maps proximate to the picture element to arrive at a final texture value. As is illustrated by line 40 in FIG. 3, this linear blending of texture values from two texture maps requires that texture elements from two texture maps be fetched for every picture element whose LOD value is not an integer. Furthermore, as there are four proximate texture elements to picture elements with fractional u, v values for each texture map, there are eight elements which generally are fetched to determine the texture value for each picture element (four for each texture map).

In contrast to the linear blending function illustrated by line 40 in FIG. 3, the present invention utilizes a non-linear blending function such as that described by line 42 in FIG. 3. As is seen in FIG. 2, line 42 illustrates that within a threshold value around each integer value level of detail of the picture element a single texture map corresponding to the level of detail of the picture element may be utilized in determining the texture value for the picture element. This threshold value is seen in FIG. 3 as the extent of the flat portions of line 42. When the difference between the level of detail of the picture element and the level of detail of a corresponding predefined texture map falls outside the threshold value, then the texture value for the picture element is determined by blending texture values calculated using texture values from textures maps of two levels of detail which are proximate to the level of detail of the picture element. This blending operation is reflected by the sloped portions of line 42. As will be appreciated by those of skill in the art, any form of blending may be utilized while obtaining the benefits of the present invention as long as for some range of values around the levels of detail of the predefined texture maps the texture value for the picture element is calculated using a single texture map.

By using a single texture map to determine the texture value for some portion of the picture elements, the number of fetches of texture data from a texture memory may be reduced with a corresponding increase in performance. As will also be appreciated by those of skill in the art, as the threshold value around the integer level of detail values of the predefined texture maps is increased, thus widening the flat portions of line 42, the number of picture elements which require only a single texture map to determine their texture values will be increased. However, eventually the range of values about a level of detail of a predefined texture map will reach the range of values about an adjacent texture map and no blending of texture maps will occur. In such an instance, the lack of blending may be perceptible to a user. Accordingly, the threshold should be selected based upon the perceptibility of differences between the level of detail of the picture element and the level of detail of the most proximate texture map to the picture element. Thus, a threshold value may be selected which in the aggregate reduces the number of texture maps required to generate textured picture elements while maintaining the benefits of blending texture maps to determine texture value for picture elements. Furthermore, the threshold value may be adaptive in that it may be modified by the image generation system as the image displayed changes or the application in the host processor changes. Accordingly, the threshold may be modified based upon the use of the system to balance the performance/quality trade-off if necessary.

As will be appreciated by those of skill in the art, a transfer function such as that illustrated by line 42 of FIG. 3 may also be utilized in determining how many texture values may be utilized from a texture map as is described above.

For purposes of illustration, an example of non-linear blending of texture values is provided below. This example illustrates many of the ways the teachings of the present invention may be utilized in texturing an object, however, the present invention should not be viewed as limited to the present examples.

After translation from screen coordinates to u, v, LOD space, the texture values used to determine the texture value for the pixel may be selected. Thus, for example, a pixel located at (225, 560) in screen coordinates may correspond to (2.1, 1.7, 3.9) in u, v, LOD space. The translation from screen coordinates to texture space may be carried out by methods known to those of skill in the art. In more traditional methods, the texture value for the pixel (225, 560) would be determined by blending the four most proximate texture values to (2.1, 1.7) for the texture maps corresponding to the LOD=3 and LOD=4. Thus, eight fetches to texture memory would be required.

However, in contrast to the more traditional methods, by utilizing the present invention only a single texture map may be required. Utilizing the present invention, the image generation system 20 determines if the LOD of the transformed pixel is within a threshold of an integer value LOD, such as an integer value ±0.2. In the present example, an LOD value of 3.9 would be within the threshold value and so the most proximate texture map to the LOD of the pixel is utilized (e.g. LOD=4). Thus, only the four texture values most proximate to (2.1, 1.7) for the LOD=4 texture map need be fetched to generate the texture value for the pixel (225, 560).

However, if it is determined that a threshold value of ±0.2 results in an unacceptably high level of noticeable defects in the generated image, the threshold value could be lowered such that smaller deviations from integer LOD values would be blended from texture maps for more than one LOD. Thus, for example, the threshold value could be lowered from ±0.2 to ±0.09. If such were the case, then the LOD value of 3.9 in the present example would not be within the threshold of an integer LOD value. Therefore, texture values from the LOD=3 and LOD=4 texture maps would be blended together to produce the texture value for pixel (225, 560).

Blending is preferably proportional based upon the difference between the most proximate LOD threshold and the second most proximate LOD threshold, however, other blending methods may be utilized. Thus, in the present example, the texture values for the texture map LOD=3 are blended with the texture values for the texture map LOD=4 based upon the difference between the LOD value of the pixel (3.9) and the closest threshold value (3.91) and the difference between the LOD of the pixel and the second closest threshold value (3.09). Such a proportional blending allows for a smooth transition from unblended to blended texture values.

As the present example illustrates, given an approximately even distribution of LOD values for pixels, smaller threshold values will typically result in less savings in memory accesses than will larger thresholds. However, it is preferred that the threshold not be established at such a high value that an unacceptable level of perceptible defects in the generated image resulting from the failure to blend texture values across levels of detail result. Such a threshold may vary based upon user sensitivity, the nature of the image being generated and the level of tolerance of defects in the image.

While the present example illustrates a non-linear blending of texture values based upon LOD, as will be appreciated by those of skill in the art, the same principles may be applied to the blending of texture values based on u and v values. However, because of the correlation between texture maps having adjacent LODs and the possibly uncorrelated relationship between adjacent texture values based on u and v, the threshold values may need to substantially lower in the u and v case.

The present invention has also been described with respect to integer LOD values for the texture maps and integer u, v values for the texture values of the texture maps. However, as will be appreciated by one of skill in the art, the present invention may be utilized with texture maps having non-integer u, v, and LOD coordinates in texture space. Thus, for example, a texture map may have an LOD value of 2.5 and the threshold would be established around 2.5 rather than an integer value.

While the present invention has been described with respect to the system of FIG. 1, the present invention may be utilized in any system for texturing using texture maps. For example, the present invention may be utilized in systems such as those described in commonly assigned U.S. patent application Ser. No. 08/661,902, entitled WAVELET COMPRESSION, U.S. patent application Ser. No. 08/661,200, entitled IMAGE GENERATION SYSTEM, U.S. patent application Ser. No. 08/661,194, entitled TEXTURING OF COMPUTER GRAPHIC IMAGES, U.S. patent application Ser. No. 08/661,031, entitled GEOMETRY PROCESSING OF DIGITAL VIDEO MODELS AND IMAGES, U.S. patent application Ser. No. 08/661,069, entitled LINEAR EXPRESSION EVALUATOR, or U.S. patent application Ser. No. 08/661,028, entitled LOAD BALANCED IMAGE GENERATION the disclosures of which are incorporated herein by reference as if set forth fully. Accordingly, the present invention should not be construed as limited to the particular embodiment described in FIG. 1.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of texturing a picture element of an image, the method comprising the steps of:

non-linearly blending texture values from a first texture map corresponding to a first level of detail and texture values from a second texture map corresponding to a second level of detail based on a determined level of detail of the picture element to create a textured value for the picture element such that the created textured value for the picture element is at least one of less than a created texture value that results from a linear blending of texture values from the first texture map and texture values from the second texture map based on the determined level of detail of the picture element if the determined level of detail is less than a first value and greater than a created texture value that results from a linear blending of texture values from the first texture map and texture values from the second texture map based on the determined level of detail of the picture element if the determined level of detail is greater than the first value.

2. A method of texturing a picture element of an image according to claim 1, wherein the step of non-linearly blending texture values comprises the step of blending texture values from the second texture map only if a magnitude of deviation of the determined level of detail corresponding to the picture element from a level of detail of the first texture map is greater than a threshold value.

3. A method of texturing a picture element according to claim 2, wherein the threshold value is selected based upon the perceptibility of differences between the level of detail of the picture element and the level of detail of the first texture map.

4. A method of texturing a picture element according to claim 2, wherein said blending step includes the step of proportionally blending the texture value of the picture element based upon the texture values of the first texture map and the texture value of the picture element and based upon the texture values of the second texture map, wherein the proportional blending is based upon the difference between the determined level of detail of the picture element and the level of detail of the first texture map.

5. A method of texturing a picture element according to claim 2, wherein said blending step further comprises blending texture values from the texture map corresponding to the first level of detail which are proximate to the picture element only if the fractional coordinates of the picture element are not within a threshold of coordinates of a texture value from the texture map corresponding to the first level of detail.

6. A method of texturing a picture element of an image, the method comprising the steps of:

blending texture values from a first texture map corresponding to a first level of detail with texture values from a second texture map corresponding to a second level of detail to create a textured value for the picture element if a magnitude of deviation of a level of detail corresponding to the picture element from a level of detail of the first texture map is greater than a threshold value; and determining the textured value from the texture values of the first texture map irrespective of a proportionality based on the level of detail of the picture element, if the magnitude of the deviation of the level of detail of the picture element from the level of detail of the first texture map is less than the threshold value.

7. A method of texturing a picture element according to claim 6, wherein the threshold value is selected based upon the perceptibility of differences between the level of detail of the picture element and the level of detail of the first texture map.

8. A method of texturing a picture element according to claim 6, wherein said blending step includes the step of proportionally blending the texture value of the picture element based upon the texture values of the first texture map and the texture value of the picture element based upon the texture values of the second texture map based upon the difference between the level of detail of the picture element and the level of detail of the first texture map.

9. A method of texturing a picture element according to claim 8, wherein said step of proportionally blending comprises the steps of:

blending texture values from a first texture map corresponding to a first level of detail with texture values from a second texture map corresponding to a second level of detail to create a textured value for the picture element if a magnitude of deviation of a level of detail corresponding to the picture element from a level of detail of the first texture map is greater than a threshold value, wherein the blending of texture values is proportional to the difference between the magnitude of deviation and the threshold value; and determining the textured value from the texture values of the first texture map if the magnitude of the deviation of the level of detail of the picture element from the level of detail of the first texture map is less than the threshold value.

10. A method of texturing a picture element of an image having a level of detail associated with the picture element, the method comprising the steps of:

acquiring a first set of texture values from a texture map corresponding to a first level of detail associated with the level of detail of the picture element;

determining a textured pixel value for the picture element from the first set of texture values;

acquiring a second set of texture values from a texture map corresponding to a second level of detail associated with the level of detail of the picture element if the level of detail of the picture element is not within a threshold of the first level of detail; and determining a blended texture pixel value for the picture element based on the first set of texture values and the second set of texture values if the level of detail of the picture element is not within the threshold of the first level of detail.

11. A method of texturing a picture element according to claim 10, wherein said step of acquiring a first set of texture values from a texture map corresponding to a first level of detail comprises the step of fetching from a texture memory texture values of the texture map corresponding to the first level of detail and wherein said step of acquiring a second set of texture values from a texture map corresponding to a second level of detail comprises the step of fetching from a texture memory texture values of the texture map corresponding to the second level of detail.

12. A method of texturing a picture element according to claim 10, wherein the threshold value is selected based upon the perceptibility of differences between the level of detail of the picture element and the level of detail of the first texture map.

13. A method of texturing a picture element according to claim 10, wherein said acquiring steps acquire texture values proximate to the coordinates of the picture element from the texture maps corresponding to their respective levels of detail only if the fractional coordinates of the picture element are not within a threshold of coordinates of a texture value from the respective texture map and acquire the most proximate texture value to the coordinates of the picture element from the respective texture maps if the fractional coordinates of the picture element are not within a threshold of coordinates of a texture value from the respective texture map.

14. A method of texturing a picture element according to claim 10, wherein said step of determining a blended texture pixel value comprises the steps of:

determining a textured pixel value for the picture element from the second set of texture values if the level of detail of the picture element is not within the threshold of the first level of detail; and determining a blended texture pixel value for the picture element by proportionally blending the textured pixel value determined from the first set of texture values and the textured pixel value determined from the second set of texture values to provide the blended texture pixel value if the level of detail of the picture element is not within the threshold of the first level of detail.

15. A method of texturing a picture element according to claim 14, wherein said step of determining a blended texture pixel value for the picture element by proportionally blending comprises blending the textured pixel values based on the difference between the level of detail of the picture element and the sum of the level of detail of the texture map corresponding to the first level of detail and the threshold value.

16. A system for texturing a picture element of an image comprising:

means for storing a plurality of texture maps; and means, operably associated with said means for storing, for non-linearly blending texture values from a first texture map of said plurality of texture maps corresponding to a first level of detail and texture values from a second texture map of said plurality of texture maps corresponding to a second level of detail based on a determined level of detail of the picture element to create a textured value for the picture element such that the created textured value for the picture element is at least one of less than a created texture value that results from a linear blending of texture values from the first texture map and texture values from the second texture map based on the determined level of detail of the picture element if the determined level of detail is less than a first value and greater than a created texture value that results from a linear blending of texture values from the first texture map and texture values from the second texture map based on the determined level of detail of the picture element if the determined level of detail is greater than the first value.

17. A system for texturing a picture element of an image according to claim 16, wherein the texture values from the second texture map are blended only if a magnitude of deviation of a level of detail corresponding to the picture element from a level of detail of the first texture map is greater than a threshold value.

18. A system for texturing a picture element according to claim 17, wherein the threshold value is selected based upon the perceptibility of differences between the level of detail of the picture element and the level of detail of the first texture map.

19. A system for texturing a picture element according to claim 17, wherein said means for blending includes means for proportionally blending the texture value of the picture element based upon the texture values of the first texture map and the texture value of the picture element based upon the texture values of the second texture map based upon the difference between the level of detail of the picture element and the level of detail of the first texture map.

20. A system for texturing a picture element according to claim 17, wherein said means for blending further comprises means for blending texture values from the texture map corresponding to the first level of detail which are proximate to the picture element only if the fractional coordinates of the picture element are not within a threshold of coordinates of a texture value from the texture map corresponding to the first level of detail.

21. A system for texturing a picture element of an image comprising:

means for blending texture values from a first texture map corresponding to a first level of detail with texture values from a second texture map corresponding to a second level of detail to create a textured value for the picture element if a magnitude of deviation of a level of detail corresponding to the picture element from a level of detail of the first texture map is greater than a threshold value; and means for determining the textured value from the texture values of the first texture map irrespective of a proportionality based on the level of detail of the picture element, if the magnitude of the deviation of the level of detail of the picture element from the level of detail of the first texture map is less than the threshold value.

22. A system for texturing a picture element according to claim 21, wherein the threshold value is selected based upon the perceptibility of differences between the level of detail of the picture element and the level of detail of the first texture map.

23. A system for texturing a picture element according to claim 21, wherein said means for blending includes means for proportionally blending the texture value of the picture element based upon the texture values of the first texture map and the texture value of the picture element based upon the texture values of the second texture map based upon the difference between the level of detail of the picture element and the level of detail of the first texture map.

24. A system for texturing a picture element according to claim 23, wherein said means for proportionally blending comprises:

means for blending texture values from a first texture map corresponding to a first level of detail with texture values from a second texture map corresponding to a second level of detail to create a textured value for the picture element if a magnitude of deviation of a level of detail corresponding to the picture element from a level of detail of the first texture map is greater than a threshold value, wherein the blending of texture values is proportional to the difference between the magnitude of deviation and the threshold value; and means for determining the textured value from the texture values of the first texture map if the magnitude of the deviation of the level of detail of the picture element from the level of detail of the first texture map is less than the threshold value.

25. A system for texturing a picture element of an image having a level of detail associated with the picture element comprising:

means for acquiring a first set of texture values from a texture map corresponding to a first level of detail associated with the level of detail of the picture element;

means for determining a textured pixel value for the picture element from the first set of texture values;

means for acquiring a second set of texture values from a texture map corresponding to a second level of detail associated with the level of detail of the picture element if the level of detail of the picture element is not within a threshold of the first level of detail; and means for determining a blended texture pixel value for the picture element based on the first set of texture values and the second set of texture values if the level of detail of the picture element is not within the threshold of the first level of detail.

26. A system for texturing a picture element according to claim 25, wherein said system further includes:

means for storing said texture maps; and wherein said means for acquiring a first set of texture values from a texture map corresponding to a first level of detail includes means for fetching from said means for storing texture values of the texture map corresponding to the first level of detail; and wherein said means for acquiring a second set of texture values from a texture map corresponding to a second level of detail includes means for fetching from said means for storing texture values of the texture map corresponding to the second level of detail.

27. A system for texturing a picture element according to claim 25, wherein the threshold value is selected based upon the perceptibility of differences between the level of detail of the picture element and the level of detail of the first texture map.

28. A system for texturing a picture element according to claim 25, wherein said means for acquiring a first set of texture values and said means for acquiring a second set of texture values include means for acquiring texture values proximate to the coordinates of the picture element from the texture maps corresponding to their respective levels of detail only if the fractional coordinates of the picture element are not within a threshold of coordinates of a texture value from the respective texture map and acquire the most proximate texture value to the coordinates of the picture element from the respective texture maps if the fractional coordinates of the picture element are not within a threshold of coordinates of a texture value from the respective texture map.

29. A system for texturing a picture element according to claim 25, wherein said means for determining a blended texture pixel value comprises:

means for determining a textured pixel value for the picture element from the second set of texture values if the level of detail of the picture element is not within the threshold of the first level of detail; and means for determining a blended texture pixel value for the picture element by proportionally blending the textured pixel value determined from the first set of texture values and the textured pixel value determined from the second set of texture values to provide the blended texture pixel value if the level of detail of the picture element is not within the threshold of the first level of detail.

30. A system for texturing a picture element according to claim 29, wherein said means for determining a blended texture pixel value for the picture element by proportionally blending comprises means for blending the textured pixel values based on the difference between the level of detail of the picture element and the sum of the level of detail of the texture map corresponding to the first level of detail and the threshold value.

31. A computer program product for texturing a picture element of an image, the computer program product comprising:

a computer-readable storage medium having computer-readable program code means embodied in said medium, said computer-readable program code means comprising:

computer-readable program code means for storing a plurality of texture maps; and computer-readable program code means, operably associated with said computer-readable program code means for storing, for non-linearly blending texture values from a first texture map of said plurality of texture maps corresponding to a first level of detail and texture values from a second texture map of said plurality of texture maps corresponding to a second level of detail based on a determined level of detail of the picture element to create a textured value for the picture element such that the created textured value for the picture element is at least one of less than a created texture value that results from a linear blending of texture values from the first texture map and texture values from the second texture map based on the determined level of detail of the picture element if the determined level of detail is less than a first value and greater than a created texture value that results from a linear blending of texture values from the first texture map and texture values from the second texture map based on the determined level of detail of the picture element if the determined level of detail is greater than the first value.

32. A computer program product for texturing a picture element of an image according to claim 31, wherein the texture values from the second texture map are blended only if a magnitude of deviation of a level of detail corresponding to the picture element from a level of detail of the first texture map is greater than a threshold value.

33. A computer program product for texturing a picture element according to claim 32, wherein the threshold value is selected based upon the perceptibility of differences between the level of detail of the picture element and the level of detail of the first texture map.

34. A computer program product for texturing a picture element according to claim 32, wherein said computer-readable program code means for blending includes computer-readable program code means for proportionally blending the texture value of the picture element based upon the texture values of the first texture map and the texture value of the picture element based upon the texture values of the second texture map based upon the difference between the level of detail of the picture element and the level of detail of the first texture map.

35. A computer program product for texturing a picture element according to claim 32, wherein said computer-readable program code means for blending further comprises computer-readable program code means for blending texture values from the texture map corresponding to the first level of detail which are proximate to the picture element only if the fractional coordinates of the picture element are not within a threshold of coordinates of a texture value from the texture map corresponding to the first level of detail.

36. A computer program product for texturing a picture element of an image, the computer program product comprising:

a computer-readable storage medium having computer-readable program code means embodied in said medium, said computer-readable program code means comprising:

computer-readable program code means for blending texture values from a first texture map corresponding to a first level of detail with texture values from a second texture map corresponding to a second level of detail to create a textured value for the picture element if a magnitude of deviation of a level of detail corresponding to the picture element from a level of detail of the first texture map is greater than a threshold value; and computer-readable program code means for determining the textured value from the texture values of the first texture map irrespective of a proportionality based on the level of detail of the picture element, if the magnitude of the deviation of the level of detail of the picture element from the level of detail of the first texture map is less than the threshold value.

37. A computer program product for texturing a picture element according to claim 36, wherein the threshold value is selected based upon the perceptibility of differences between the level of detail of the picture element and the level of detail of the first texture map.

38. A computer program product for texturing a picture element according to claim 36, wherein said computer-readable program code means for blending includes computer-readable program code means for proportionally blending the texture value of the picture element based upon the texture values of the first texture map and the texture value of the picture element based upon the texture values of the second texture map based upon the difference between the level of detail of the picture element and the level of detail of the first texture map.

39. A computer program product for texturing a picture element according to claim 38, wherein said computer-readable program code means for proportionally blending comprises:
   computer-readable program code means for blending texture values from a first texture map corresponding to a first level of detail with texture values from a second texture map corresponding to a second level of detail to create a textured value for the picture element if a magnitude of deviation of a level of detail corresponding to the picture element from a level of detail of the first texture map is greater than a threshold value, wherein the blending of texture values is proportional to the difference between the magnitude of deviation and the threshold value; and
   computer-readable program code means for determining the textured value from the texture values of the first texture map if the magnitude of the deviation of the level of detail of the picture element from the level of detail of the first texture map is less than the threshold value.

40. A computer program product for texturing a picture element of an image having a level of detail associated with the picture element, the computer program product comprising:
   a computer-readable storage medium having computer-readable program code means embodied in said medium, said computer-readable program code means comprising:
   computer-readable program code means for acquiring a first set of texture values from a texture map corresponding to a first level of detail associated with the level of detail of the picture element;
   computer-readable program code means for determining a textured pixel value for the picture element from the first set of texture values;
   computer-readable program code means for acquiring a second set of texture values from a texture map corresponding to a second level of detail associated with the level of detail of the picture element if the level of detail of the picture element is not within a threshold of the first level of detail; and
   computer-readable program code means for determining a blended texture pixel value for the picture element based on the first set of texture values and the second set of texture values if the level of detail of the picture element is not within the threshold of the first level of detail.

41. A computer program product for texturing a picture element according to claim 40, wherein said computer program product further includes:
   computer-readable program code means for storing said texture maps; and
   wherein said computer-readable program code means for acquiring a first set of texture values from a texture map corresponding to a first level of detail includes computer-readable program code means for fetching from said computer-readable program code means for storing texture values of the texture map corresponding to the first level of detail; and
   wherein said computer-readable program code means for acquiring a second set of texture values from a texture map corresponding to a second level of detail includes computer-readable program code means for fetching from said computer-readable program code means for storing texture values of the texture map corresponding to the second level of detail.

42. A computer program product for texturing a picture element according to claim 40, wherein the threshold value is selected based upon the perceptibility of differences between the level of detail of the picture element and the level of detail of the first texture map.

43. A computer program product for texturing a picture element according to claim 40, wherein said computer-readable program code means for acquiring a first set of texture values and said computer-readable program code means for acquiring a second set of texture values include computer-readable program code means for acquiring texture values proximate to the coordinates of the picture element from the texture maps corresponding to their respective levels of detail only if the fractional coordinates of the picture element are not within a threshold of coordinates of a texture value from the respective texture map and acquire the most proximate texture value to the coordinates of the picture element from the respective texture maps if the fractional coordinates of the picture element are not within a threshold of coordinates of a texture value from the respective texture map.

44. A computer program product for texturing a picture element according to claim 40, wherein said computer-readable program code means for determining a blended texture pixel value comprises:
   computer-readable program code means for determining a textured pixel value for the picture element from the second set of texture values if the level of detail of the picture element is not within the threshold of the first level of detail; and
   computer-readable program code means for determining a blended texture pixel value for the picture element by proportionally blending the textured pixel value determined from the first set of texture values and the textured pixel value determined from the second set of texture values to provide the blended texture pixel value if the level of detail of the picture element is not within the threshold of the first level of detail.

45. A computer program product for texturing a picture element according to claim 44, wherein said computer-readable program code means for determining a blended texture pixel value for the picture element by proportionally blending comprises computer-readable program code means for blending the textured pixel values based on the difference between the level of detail of the picture element and the sum of the level of detail of the texture map corresponding to the first level of detail and the threshold value.

\* \* \* \* \*